United States Patent Office 3,608,250
Patented Sept. 28, 1971

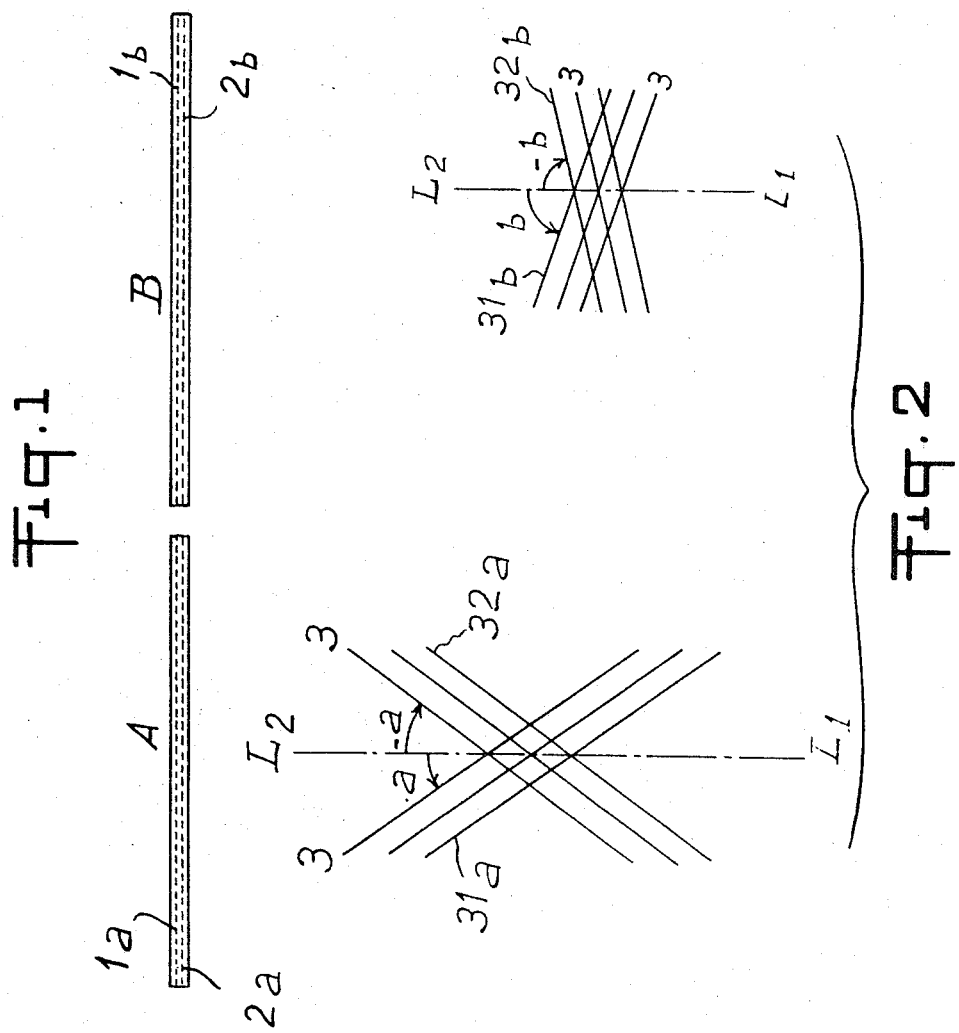

3,608,250
INFLATABLE STRUCTURAL MEMBERS
Roger Eugene Ducrocq, Clermont-Ferrand, France, assignor to Pneumatiques, Caoutchouc Manufacture et Plastiques Kleber-Colombes, Colombes, France
Filed July 22, 1969, Ser. No. 843,641
Claims priority, application France, July 24, 1968, 160,498
Int. Cl. E04b 1/345
U.S. Cl. 52—2
3 Claims

ABSTRACT OF THE DISCLOSURE

This invention relates to inflatable members that can be used as structures or as supports for structures and a member comprises at least two parts having different extension characteristics, each of these parts being made of an elastic material reinforced by at least two layers formed of mutually parallel elements which are superimposed and crossed symmetrically relatively to the longitudinal direction of the member so that the angle formed by one of the elements of one of the parts is different from the angle formed by the elements of the other part.

---

Figure 3:
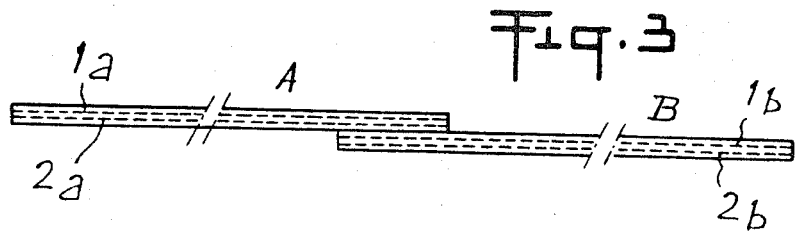

The present invention relates to inflatable structural members which may be used in particular to form all or part of the framework of structures or in order entirely to constitute such structures by juxtaposing several such members. Such inflatable members may, for example, be used in structures such as tents which must be easy to carry, assemble and dismantle.

Hitherto, particular stress has been paid on the use of such structural members which are rectilinear after inflation and which are formed into desired shapes by various means such as tensioned bracing members. However, this method involves a number of disadvantages such as the difficulty involved in assembly, unpleasing appearance and instability. It has also been suggested that such members be formed of superimposed portions with different extension characteristics so that they bend during inflation, but elements of this type as hitherto described, in practice possess a number of disadvantages and have therefore only been used little, if at all.

Some such elements, such as those described in U.S. Pat. 3,332,177 are composed of sheets of different thickness made of a thermoplastic material and without reinforcement.

As a result of insufficient mechanical strength, they can only be used in small light structures and can only withstand slight inflating pressures so that they cannot be given a sufficient degree of rigidity. Moreover, the degree to which thermoplastic materials may be elastically stretched is small so that when these elements are inflated they are generally caused to extend in a permanent manner, that is to say, they are plastically deformed. Furthermore, since it is impossible to combine sheets of very different thicknesses, it is impossible to produce certain shapes with, for example small radii of curvature.

Other elements, such as those described in U.S. Pat. 2,743,510 are made of two parts of a rubberised biassed fabric, the fabric constituting one of the parts having extension characteristics different from those of the fabric constituting the other part. The fabric involved is a polyamide nylon but in one part this polyamide is treated so as to cause it either not to stretch or only to stretch slightly while in the other part the fabric is not treated at all.

In elements of this kind, the difference in the stretching characteristics is a matter solely of the treatment or non-treatment of polyamide. The result is that in order to bend these elements they have to be inflated to a very high pressure. Conseqeuntly the fabric used has to be heavy. On the other hand, this difference is always the same so that for a given inflating pressure all the elements of a given diameter necessarily have the same radius of curvature so that it is impossible to produce structures of any desired shape. Moreover, the stretching of a biassed fabric is the result not only of the extension of the fibres but also of the fact that the sinusoidal shapes formed by the crossing wires tend to become flattened under the effect of stresses. Now, since these fabrics have only been rubberised and no layer of rubber separates the wires of the warp from the wires of the weft, there is no elastic means which causes these wires to return to their initial position. The result is a permanent stretching, that is to say a permanent deformation of the elements, the said deformation being all the greater due to the fact that as is well known, untreated nylon is a material subject to creep, that is to say the stretching is permanent and non-elastic.

It is an object of the invention to provide inflatable structural members which are also constituted of two portions having different characteristics of elasticity but which have numerous advantages compared with conventional elements, particularly those of only undergoing very slight permanent deformation, if any, and of being able to be made so as to possess any radius of curvature for a given pressure and diameter, of being extremely rigid when inflated and of possessing a high mechanical strength.

According to the invention, these results are obtained by forming the members in at least two parts of an elastic material in which are embedded reinforcing elements arranged so as to impart to both these portions different characteristics of elastic extension.

Hitherto, inflatable members have been described in relation to the production of structures or shelters but they may, of course, be used for other purposes, such as the support of galleries or tunnels during construction, for structures used for purposes of publicity or for objects which have no other value but an aesthetic one.

Each part of the inflatable member, which is made of an airtight elastic material such as rubber, may be reinforced by at least two layers of "corded" fabric which are superimposed and crossed symmetrically relatively to the length of the element, the angle at which the reinforcing layers in one of the parts of the inflatable element are arranged relatively to the length of the element being different from that at which the reinforcing layers of the other part are arranged. By "corded" fabric should be understood an assembly of elements such as wires, cables or strands which are parallel to one another and embedded in an elastic material. These fabrics are well known in the rubber industry. Wires, cables or strands may be constituted of a natural, artificial or synthetic textile material or be of glass or metal.

In one part of the inflatable member a corded fabric is positioned so that its elements form, with the longitudinal axis, an angle $a$ and another corded fabric is superimposed thereon and arranged in such a manner to form with the longitudinal axis an angle equal to $-a$.

In the other portion of the inflatable member, two layers of corded fabric may be arranged in the same way but form with the longitudinal axis an angle $b$ which is different from the angle $a$.

In the course of this description, mention will be made of the angles $a$ or $b$ as being the angles of positioning of the corded fabrics, it being understood that with each layer of corded fabric positioned to form an angle $a$ or $b$ there is associated, in the same portion of the inflatable element, another layer of corded fabric which is superimposed thereon and positioned to form an angle $-a$ or $-b$.

There are thus formed in both parts diamond-shaped arrangements, the diagonals of which are parallel and perpendicular to the direction of the length of the element, these diamonds being embedded in an elastic material and deformable when subjected to stress whereas when the stress ceases they return to their original shape.

Pressurisation causes a different variation in the length of each of the portions of the inflatable element, thus causing the element to bend.

All things otherwise being equal, the variation in length in each of the portions depends upon the angles $a$ and $b$ and the radius of curvature of the bent or curved member since inflation depends upon the difference between $a$ and $b$.

It is well known that in an inflated tube which is reinforced with elements twisted to form a spiral or helical shape, the theoretical position of equilibrium of these elements corresponds to an angle of 54°44' to the longitudinal axis. It is thus important to ensure that the angle $a$ is less than 55° and the angle $b$ greater than 55° so that one of the portions of the inflatable member extends while the other contracts.

The variations in the length of the two portions, and hence the radius of curvature, also depend particularly, as is well known to a person skilled in the art, on the characteristics of the elastic material in which the elements constituting the corded fabric are embedded, and on the thickness and characteristics of the material which join these two layers of corded fabric.

Figure 4:
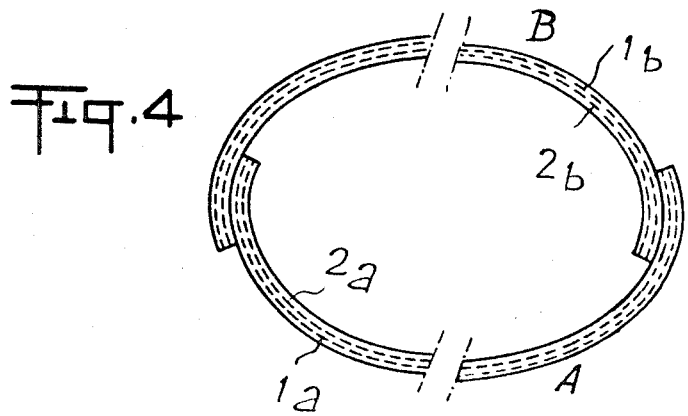
Figure 5:
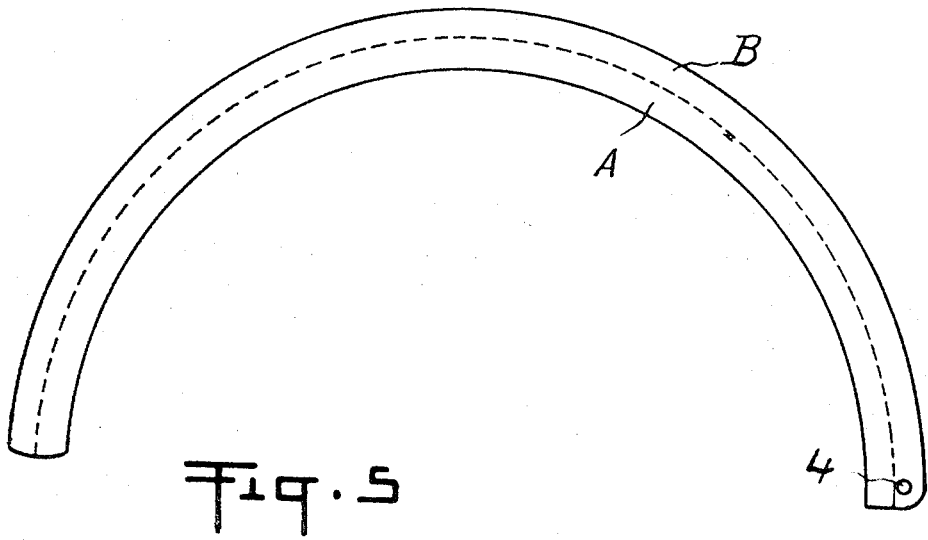
Figure 6:
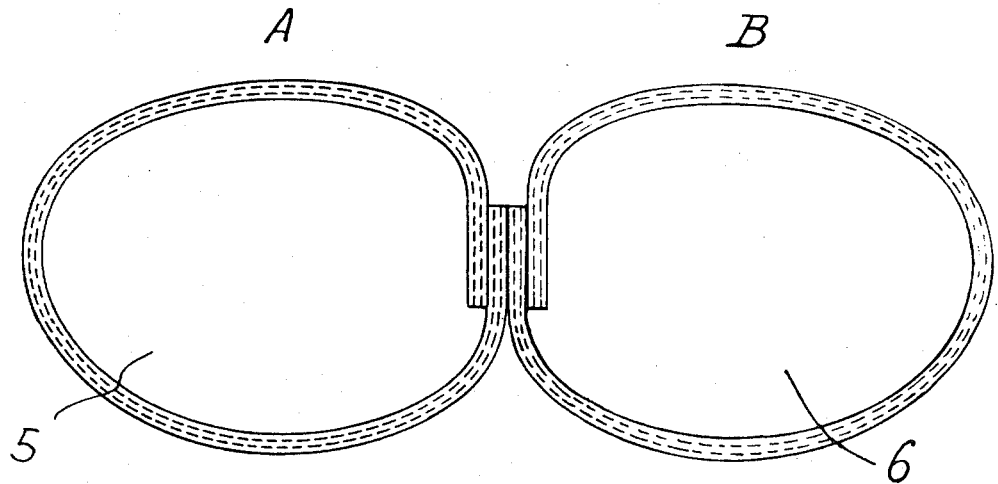
Figure 7:
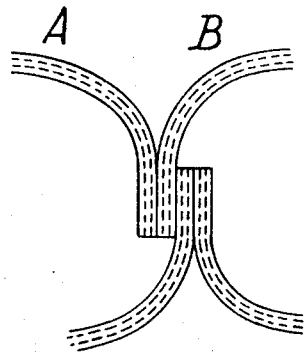
Figure 8:
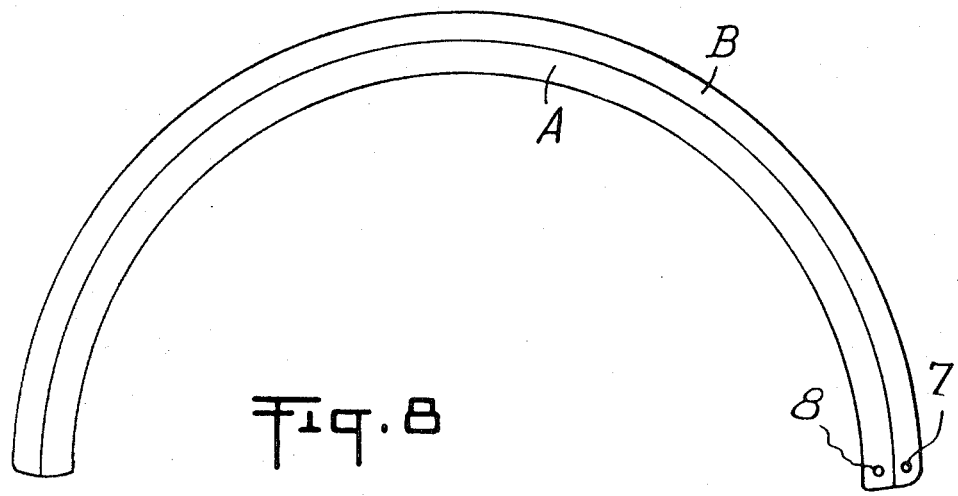

The invention will now be described in greater detail by means of the following embodiments, given by way of non-limiting example and illustrated in the accompanying drawings which are diagrammatic and not to scale. In the drawings:

FIG. 1 shows a section through the two portions of an inflatable structural member of the invention before the said portions have been joined together, FIG. 2 shows a plan view of the reinforcement of each of these parts, FIGS. 3 and 4 show the join between the two parts, FIG. 5 shows an elevational view of a member of the invention after inflation, FIG. 6 shows a section through another embodiment of member according to the invention, which is the result of another method of connecting the two parts shown in FIG. 1, FIG. 7 shows another method of connecting the two parts shown in FIG. 1, and FIG. 8 shows an elevational view of the element shown in FIG. 6.

Referring now to the drawings, the parts A and B are sheets of rubber of equal thickness, each of which is reinforced with two layers $1a$, $2a$, and $1b$, $2b$ of corded fabric. Each layer of corded fabric is constituted by wires 3 parallel to one another and embedded in an elastic material. The wires 3 in the layers $1a$, $2a$ and $1b$, $2b$ are given the reference numbers $31a$, $32a$ and $31b$, $32b$ (FIG. 2).

In the embodiment shown, the corded fabrics in part A are arranged at 35° and those in part B at 75° to the axis of the element. This means that the wires $31a$ form with the longitudinal direction L1 and L2 an angle $a$ equal to 35° while the wires $32a$ form an angle equal to $-a$ or $-35°$ with the same axis. The same is true for the wires $31b$ and $32b$ which form angles equal to 75° and $-75°$ respectively with the longitudinal direction L1, L2.

The wires $31a$ and $32a$, like the wires $31b$ and $32b$, form diamond shapes embedded in the elastic material.

By hot or cold bonding or by any other conventional method, the parts A and B are connected together as shown in FIGS. 3 and 4 so as to form a kind of tube which is closed at its end, that is to say, an enclosure.

When a gas such as air is introduced by means of one or more valves as shown at 4 (FIG. 5) and when pressure increases, the wires $31a$ and $32a$ are drawn towards their theoretical position of equilibrium which is 54°44'. The diamond shapes formed by the wires are deformed and flattened in such a manner that the angle $a$, which was equal to 35°, increases. The portion A of the enclosure then contracts.

The wires $31b$ and $32b$ are also urged towards the theoretical position of equilibrium but the diamond shapes which they form extend so that the angle $b$, which was equal to 75°, is reduced, the portion B of the enclosure then extends.

It is these variations in the length of the diamond shapes, due to the changes in the direction of the reinforcing elements, which cause the member shown in FIG. 5 to bend along the arc of a circle.

When the walls of the member are no longer subjected to the influence of pressure, the reinforcing elements return to their initial position as a result of the elasticity of the material in which they are embedded. There is thus no permanent deformation.

A slight pressure only is required in order to bend an inflatable member of the invention and in order to give it a substantial rigidity. Thus, in the case of a structural member 9 metres long in which the wires 3 were made of artificial silk and which had a diameter of 400 millimetres when inflated, the radius of curvature and the deflection brought about by the imposing of a load of 100 kilograms has been measured while varying the pressure.

The following table gives the result of these measurements:

| Pressure in g./sq. cm. | Radius of curvature in meters | Flexure under 100 kg. load in mm. |
|---|---|---|
| 240 | 3.25 | 300 |
| 300 | 3 | 225 |
| 350 | 2.70 | 200 |

Under the effect of these loads, the stresses are generally confined to certain areas and this may result in deformation at the level of greatest stress. Thus, generally, the cross-section of the member is increased in the zones in which stresses occur and this causes improved performance.

For a given elastic material, the radius of curvature depends upon the positioning angles of the reinforcements for parts A and B and on the pressure within the enclosure, the size of the arc of a circle depending, for a given radius of curvature, on the length of the inflatable member.

The invention thus makes possible the production of inflatable arches or similar vaulted structures, or supports of any dimension. Most of the problems which arise in practice may be resolved by making the angle $a$ an angle of between 25° and 55° and the angle $b$ an angle of between 60° and 80°.

It is also possible to form framework elements of various shapes by placing end to end inflatable elements such as that of the example but each with different characteristics. It is also possible to use elements which remain straight when inflated. This means that it is possible to obtain inflatable framework elements in which straight portions follow curved portions which may be of different radii of curvature and even in different planes.

It has been found that the problem of sealing the ends of the elements and anchoring them to the ground may advantageously be solved by connecting them together and by securing the ends of the tube thus formed to the walls of a metal cylinder, the base of which is closed by a metal plate by welding or in any other manner.

In the embodiment shown in FIGS. 6 to 8 the two parts A and B are the same as before but they have been bent and bonded by their edges so as each to form an enclosure 5 and 6.

The enclosures 5 and 6 are then bonded to one another along their full length.

Air or other inflating gas is pumped into each of them at the same pressure through valves such as 7 and 8. Communicating ducts may also be provided between these two enclosures in order to ensure that pressure is equalised.

In all these cases, members according to the invention may take the form, before inflation, of a flexible strip which may be easily folded, transported and stored.

I claim:

1. An elongated inflatable structural member which in the non-inflated condition is substantially rectilinear and which bends under the effect of inflation, constituted by two parts each of substantially the same elasticity and thickness and each reinforced by at least two sets of mutually parallel elements, which sets are superimposed and crossed symmetrically relatively to the longitudinal direction of said member, the angle between the sets reinforcing one of said parts and said longitudinal directions being between 25° and 55° and the angle between the sets reinforcing the other of said parts and said longitudinal direction being between 60° and 80°, whereby under the effect of inflation the angles between both sets of parallel elements and said longitudinal direction alter toward the theoretical position of equilibrium and the member becomes longitudinally curved.

2. A structural member according to claim 1, which is formed of two tubes which are bonded together along their full length.

3. A structural member according to claim 1 comprising a metal cylinder closed by a metal base, the ends of the limbs of each set being connected together at their ends to form a tubular part which is secured to the walls of said cylinder.

References Cited

UNITED STATES PATENTS

| | | | |
|---|---|---|---|
| 2,743,510 | 5/1956 | Mauney et al. | 52—2X |
| 3,108,628 | 10/1963 | Kraft | 152—354 |
| 3,244,214 | 4/1966 | Bush | 152—354 |
| 3,280,877 | 10/1966 | Hanus | 152—354 |
| 3,332,177 | 7/1967 | Sepp | 52—2 |
| 3,397,729 | 8/1968 | Sperberg | 152—354 |
| 3,404,720 | 10/1968 | Fletcher | 152—354 |
| 3,426,825 | 2/1969 | Leibee | 152—354X |
| 3,480,065 | 11/1969 | Uerdier | 152—354X |

FRANK L. ABBOTT, Primary Examiner

S. D. BURKE, Assistant Examiner